Figure 3:
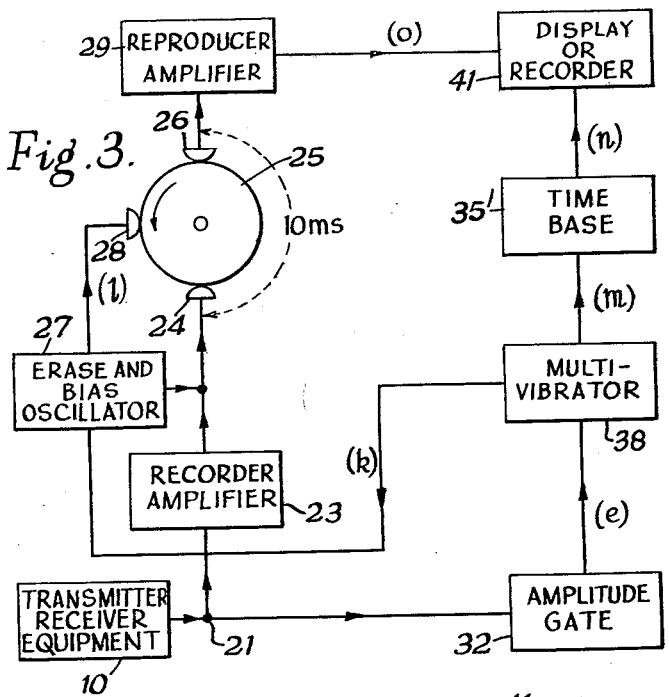

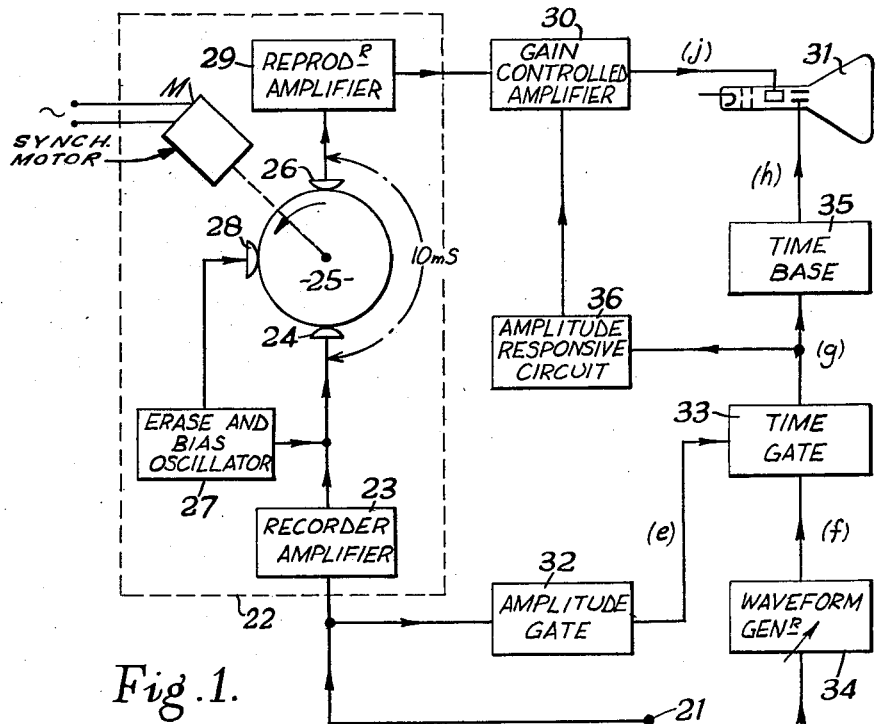
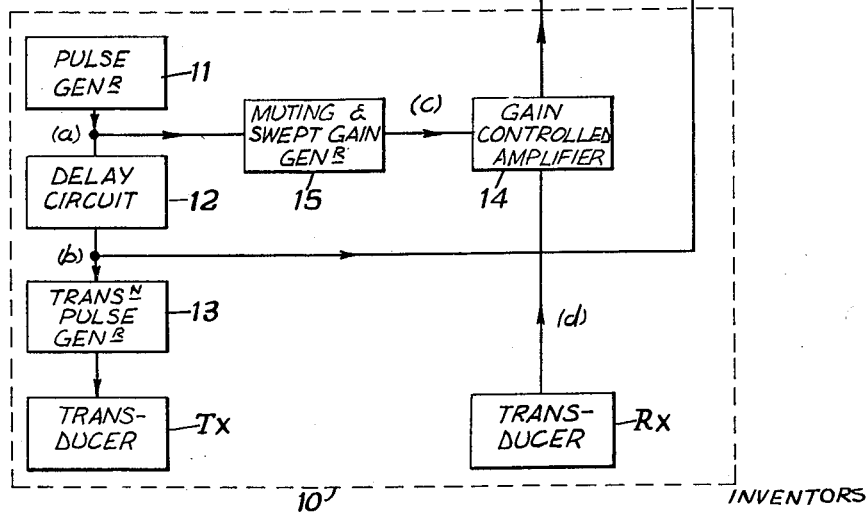
Fig. 1.

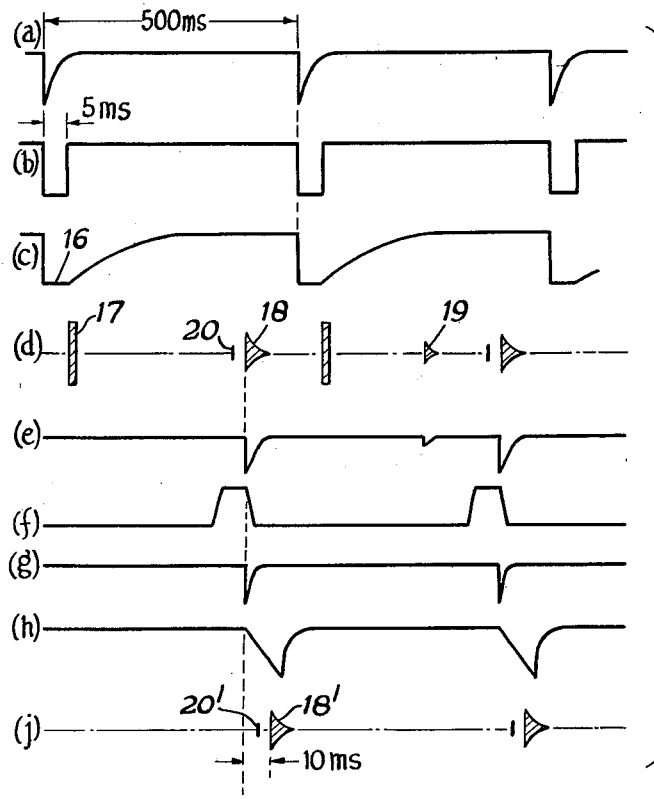
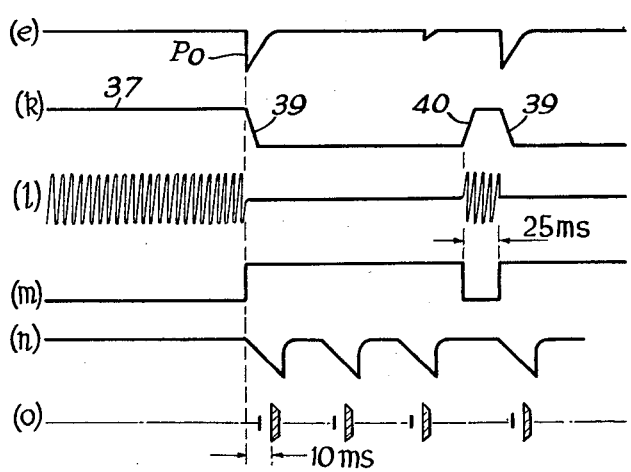
Fig.2.
Fig.4.

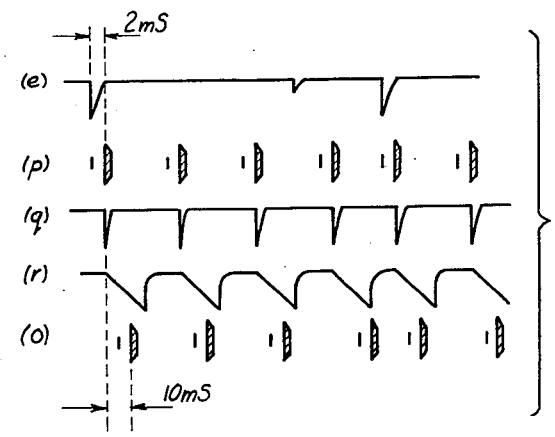
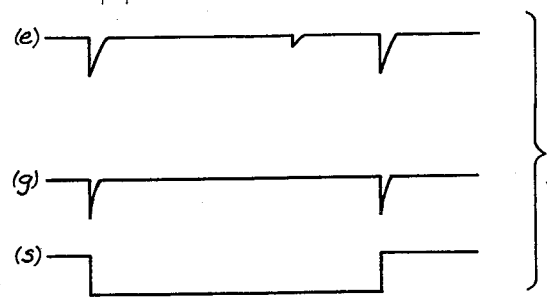
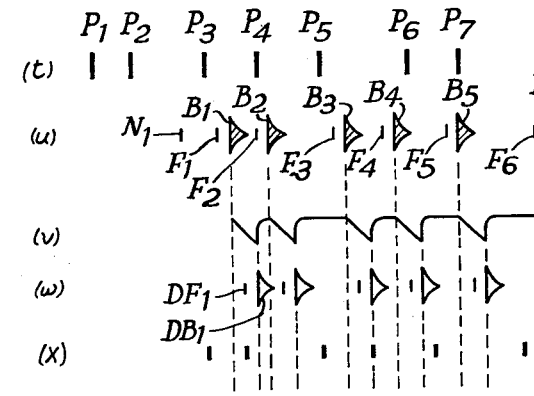
Fig. 6.
Fig. 8.
Fig. 9.

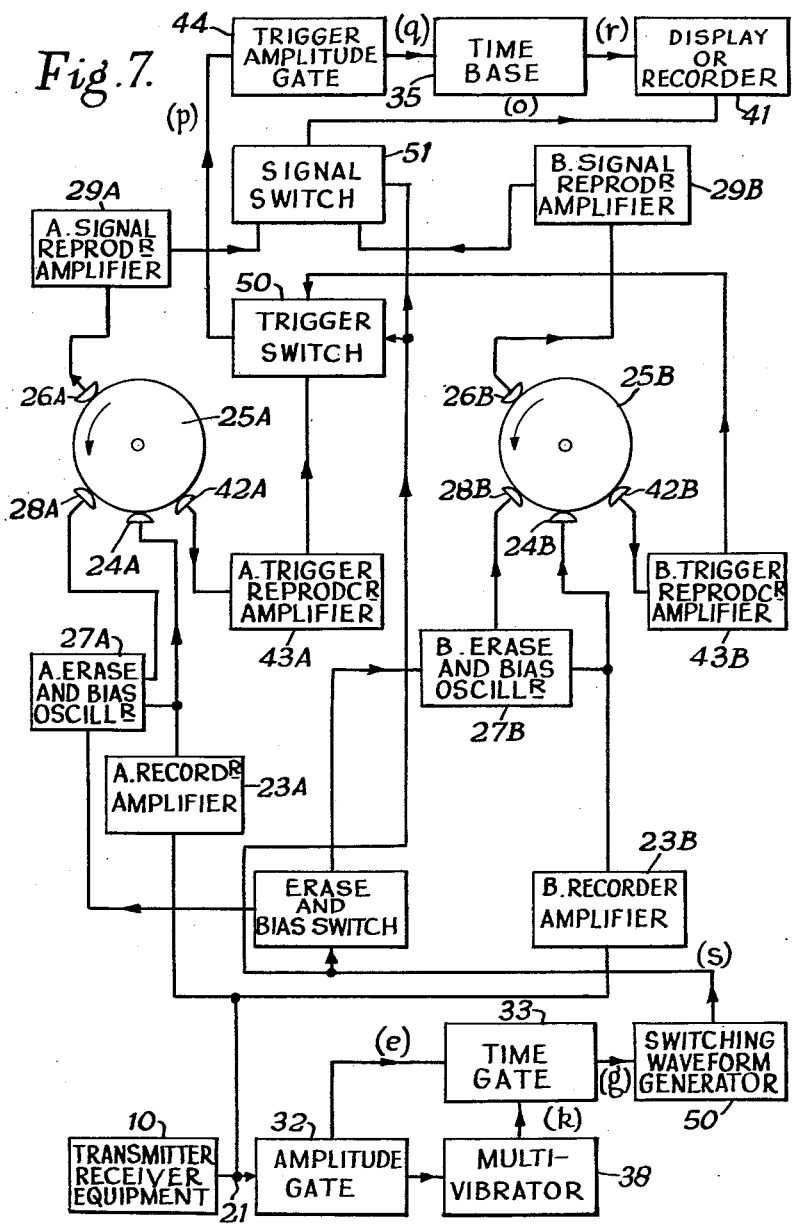

United States Patent Office 3,119,091
Patented Jan. 21, 1964

3,119,091
ECHO-RANGING AND THE LIKE
Peter Roy Hopkin and William Halliday, Barkingside, England, assignors, by mesne assignments, to S. Smith & Sons (England) Ltd., London, England, a corporation of England
Filed Jan. 23, 1956, Ser. No. 560,820
Claims priority, application Great Britain Jan. 25, 1955
32 Claims. (Cl. 340—3)

The present invention relates to echo-ranging and the like, that is to say systems in which pulses or bursts of waves are emitted from a transmitter, some of the wave energy is reflected as echo signals from objects in their path back to a receiver and the received echo signals are displayed or recorded upon a time base. Examples of such systems are echo-sounding in water, flaw detection in solid bodies to be tested, and radar.

For some purposes in echo sounding it is required to scan a range of depths which is close to the sea bottom and which is only a small fraction of the total depth from the surface to the bottom. An example is the detection of fish close to the sea bottom where for example the total depth may be about 200 fathoms and the range of depths to be investigated may be of the order of one to two fathoms from the bottom.

For such purposes a cathode ray tube "A-scope" presentation has been found preferable to a recorder, such as an electrolytic pen-type recorder. One reason is that with the former, which operates by deflection of a spot, a greater number of discrete levels of echo intensity can be represented than with the latter, with which different echo intensities are represented by different degrees of darkening of a paper strip.

Another reason is that the intensity of the spot in a cathode ray tube varies inversely as the speed of movement of the spot. It is usually arranged that the large echo received from the bottom deflects the spot off the screen and hence with this echo the speed of the spot is high. With an echo received from a fish near the bottom, on the other hand, the spot will be deflected only to a small extent and its brightness will, therefore, be relatively high.

Certain difficulties, however, arise from the fact that the range of depths presented on the screen is required to be only a small fraction of the total depth. Thus, for instance, with a total depth of 200 fathoms, the echo time, that is the time between the emission of a pulse and the receipt of the echo, is about 500 milliseconds and the pulse repetition period employed is about the same. The range scanned may, however, represent only, say, 30 milliseconds. The result is that the operator viewing the screen is presented with very brief pictures of the echoes recurring at about ½ second intervals. It has been found that considerable fatigue results.

Moreover, because of the comparatively long interval between presentations, no two successive pictures are exactly the same, and, in particular, the range from ship to bottom has usually changed appreciably owing to the ship's motion. Since the sime base of the cathode ray tube is triggered in dependence upon the time of occurrence of the transmitted pulse, this means that the position of the bottom echo on the cathode ray tube display is continually shifting, thus making a comparison of successive pictures difficult.

The use of a screen of high persistence is of very limited assistance since with such a screen the brightness decays rapidly to begin with, even though it may persist at a low intensity for a long time.

Corresponding difficulties to those above set forth in connection with echo sounding may be met with in other like systems.

The present invention has for its principal object to provide improved echo-ranging and like equipment in which one or both of the difficulties mentioned is or are substantially reduced or eliminated.

According to the present invention there is provided echo-ranging or like equipment for displaying or recording echo signals from a predetermined range of distances from a wave transmitter, the equipment comprising a display or recording device, means for triggering a time base of the display or recording device under the control of an echo signal from a region within or without the said range, means for delaying received echo signals from within the said range by a time equal to or greater than the time of travel of the wave between the extremity of the said range nearer the transmitter and the said region, and means for applying the delayed signals to the display or recording device.

In the case of echo sounding, the said region may be the sea bottom and the invention is of special value when the predetermined range is near the sea bottom. Since, when using the present invention, the bottom echo serves to control the triggering of the time-base, and since the delay of the received signals applied to the tube is fixed, the position on the screen of the cathode ray tube of the bottom echo remains fixed.

In the case of flaw detection the said region may be the rear surface of the body under test, that is the surface opposite to that into which the waves are injected and through which they are received after reflection. In radar, the said region may for example be the coastline when the equipment is being operated from aircraft or at sea.

The pulses may be emitted at regular or irregular intervals and the intervals may be wholly random throughout or may be in recurrent like groups, the intervals within each group varying in random or regular manner.

According to a further feature of the invention, the time base is arranged, between successive transmissions, to execute a plurality of sweeps and to display or record the same echo signals, suitably delayed, during each of these sweeps. In this way, instead of only one picture being presented during each interval between transmitted pulses, a considerable number of like pictures can be presented, thereby reducing fatigue of the operator and increasing the time during which echoes can be studied.

Figure 5:
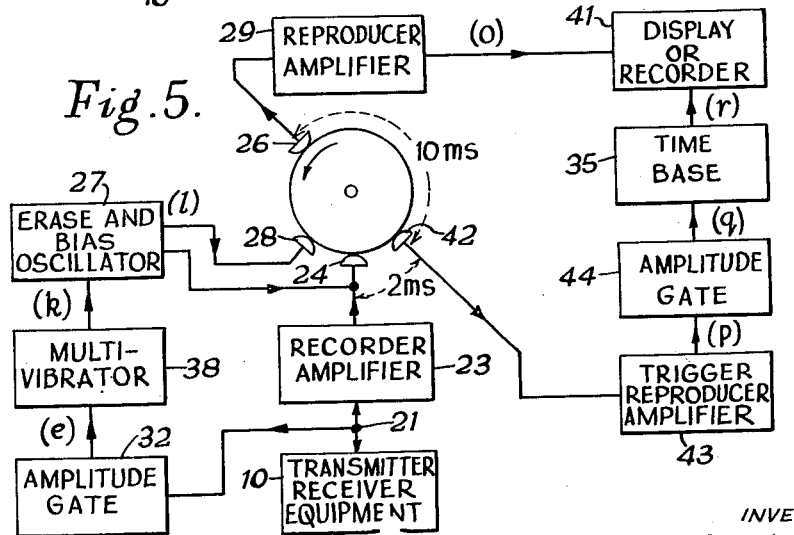

The invention will be described by way of example as applied to echo sounding, with reference to the accompanying drawings in which FIG. 1 is a block circuit diagram of one embodiment of the invention, FIG. 2 contains waveform diagrams showing the waveforms (in idealised form) occurring at various points in FIG. 1, FIGS. 3, 5 and 7 are block circuit diagrams of other embodiments of the invention, FIGS. 4, 6 and 8 show additional waveforms present in the circuits of FIGS. 3, 5 and 7 respectively, and FIG. 9 shows waveforms occurring in another form of the invention.

Like parts in the several figures have the same reference. Each of the waveforms is designated by a small letter and this letter appears in the circuit diagrams at the point where that waveform occurs. In FIGS. 4, 6 and 8, waveforms occurring in the circuits of FIGS. 3, 5 and 7 which are the same as those in FIG. 2 are not repeated excepting for waveform (e) which is included in order to show the time relationship between the various waveforms.

Referring to FIGS. 1 and 2, what will be called transmitter-receiver equipment is included within a broken line rectangle 10. It includes a pulse generator 11 generating pulses (a) of recurrence period 500 ms. which are applied to a delay circuit 12 which may be a pulsebroadening circuit producing the pulses (*b*) of say 5 ms. duration. The recurrence period chosen in this example is suitable for use up to a range of 200 fathoms without ambiguity. The trailing edges of the pulses (*b*) serve to trigger a transmission pulse generator 13 which generates a burst of oscillation of suitable frequency at each triggering, and these bursts are applied to a transducer T*x* by which waves are emitted into water.

A receiving transducer R*x* receives echoes which produce an echo signal output (*d*) which is applied to a gain-controlled amplifier 14. The pulse (*a*) are fed to a muting and swept gain generator 15 which generates therefrom the waveform (*c*) which is applied to the amplifier 14 to control its gain. The first part 16 of the waveform (*c*) is designed to mute the amplifier 14 and the delay imposed by the circuit 12 is chosen to ensure that the muting has become effective before transmission occurs. Thereafter the waveform (*c*) increases the gain of the amplifier 14 to a maximum after about 250 ms. In this way compensation is provided for the decrease in the echo amplitude with range.

The echo signal (*d*) includes a break-through 17 of the transmitted pulse, a bottom echo 18 and a second time bottom echo 19 which is produced by the transmitted pulse reflected first from the bottom, then from the surface, and again from the bottom. A fish echo 20 is also shown. All the components of the waveform (*d*) that have been mentioned arise from the same transmitted pulse 17 and later transmitted pulses give rise to corresponding components.

The echo signal at terminal 21 is applied to a delay unit 22, shown within broken lines, and comprising a recorder amplifier 23 the output of which is connected to a magnetic recording head 24 adapted to record the signals upon the surface of a drum 25 of magnetic material. The drum is rotated by a suitable synchronous motor M at such a speed that the desired time delay can be produced between the recording head 24 and a reproducing head 26. The time delay in the present example is 10 ms. and the drum 25 is therefore rotated at 3000 r.p.m. An erase and bias oscillator 27 is also provided, in known manner, to feed erase oscillations to a head 28 and bias oscillations to the recording head.

The signals picked up by the head 26 are amplified at 29 and fed through a gain controlled amplifier 30, whose purpose will be referred to later, to a display device 31; in this example to a Y-deflecting plate of a cathode ray tube, where they have the form and relative timing shown at (*j*) in FIG. 2. Thus they comprise bottom echoes 18' and fish echoes 20' delayed by 10 ms. relatively to the corresponding parts 18 and 20 respectively of the waveform (*d*). It will be noted that the transmitted pulse 17 has been eliminated from waveform (*j*) by the muting generator 15.

The signals from 21 are also applied to an amplitude gate 32 adapted to pass only the large amplitude of the bottom echo pulses 18, thus producing the waveform (*e*) which is fed to a time gate 33. The waveform (*b*) is applied from the delay circuit 12 to a waveform generator 34 adapted to generate therefrom the waveform (*f*). The time delay of the pulses in waveform (*f*) relatively to those of the waveform (*b*) is adjustable in the generator 34. The waveform (*f*) is fed to the time gate 33 to open this gate during the positive-going pulses of the waveform and the output (*g*) of the time gate 33 therefore has the form shown in FIG. 2. These pulses (*g*) serve to trigger a time base 35, which may have a working stroke of 10 ms., to generate the time base waveform (*h*) which is applied to the X-deflecting plates of the tube 31. The waveform (*f*) applied to the time gate 33 ensures that the triggering pulses (*g*) correspond only to the bottom echoes 18 and not to second time bottom echoes 19.

The time relationship between the waveform (*j*) fed to the Y-plates and the waveform (*h*) fed to the X-plates is seen from FIG. 2. Thus the sweep of the cathode ray display represents a range of distances from the transmitter including the bottom and the fish echo.

The purpose of the gain-controlled amplifier 30 is to afford compensation for variations in the amplitude of echoes due to changes in propagation conditions. The waveform (*g*) is fed to an amplitude measuring circuit 36 which generates a control voltage dependent upon the amplitude of the pulses on the waveform (*g*). This control voltage is applied to the amplifier 30 in suitable sense to control its gain.

It will be seen that since the time base is triggered at the time of occurrence of the bottom echo signal in the receiver and since the echo signals displayed by the cathode ray tube are delayed in time by 10 ms. relatively to the received echo signals, the echo signals received during the last 10 ms. before the arrival of the bottom echo will be displayed. The echoes from objects at a fixed distance from the bottom will be presented in fixed position irrespective of any motion of the ship.

Suitable means are provided to rotate the recording drum 25 at a fixed speed in order that the time delay introduced may remain constant.

The embodiment shown in FIG. 3 provides for a plurality of sweeps of the time base during each bottom echo recurrence period. The transmitter-receiver equipment may be as shown at 10 in FIG. 1 and is represented in FIG. 3 by a block 10. The waveform (*e*) from the amplitude gate 32 is in this case fed to a multi-vibrator 38 replacing the manually adjustable time gate 33 of FIG. 1 and generating an output (*k*) (FIG. 4) which controls the erase and bias oscillator 27 to generate the waveform (*l*). It also generates a waveform (*m*) for triggering the time base 35'. The multi-vibrator 38 is so constituted that it responds to a negative triggering pulse of waveform (*e*) to produce a negative-going edge 39 in waveform (*k*) and then remains unresponsive to any further triggering pulses until a predetermined time has elapsed when it produces the positive-going edge 40. The multi-vibrator is then in condition to respond to a further triggering pulse.

The time interval between the edge 40 and the expected time of arrival of the next edge 39 is arrived at by adding the time equivalent of the possible motion of the ship, say 10 ms., to the delay between the erase and reproducing heads 28 and 26, say 15 ms., to give a figure of 25 ms.

The waveform (*k*) ensures that erasure and recording take place only during the intervals 40 to 39 which in this example are of 25 ms. duration. Thus the reproducing head 26 picks up the recorded signals a plurality of times and generates the waveform (*o*). The pulse $P_0$ in waveform (*e*) is assumed to be the first pulse and it is for this reason that the part 37 of waveform (*k*) is shown as positive.

The time base 35' is such that it is triggered by negative-going edges 39 and, once triggered, runs freely generating a plurality of sweeps as shown at (*n*) until it is stopped by a positive-going edge 40. The recurrence frequency of the time base is adjusted accurately to be equal to the time of rotation of the drum 25 and the delayed echo signals (*o*) are then displayed a number of times during each recurrence period of the transmitted pulses.

The waveforms shown are of course not to scale and with a transmitted pulse recurrence period of 500 ms. and a time base sweep of 12 ms., the number of repetitions of the echo signals will normally be much greater than the three shown.

The signals (*o*) are fed to a presentation device which may be a display device 41 such as a cathode ray tube, or a recording device, and the time base waveform (*n*) is applied to produce the time base of the device.

The embodiment of FIG. 5, with the additional waveforms of FIG. 6, provides a plurality of sweeps in each recurrence period without requiring accurate timing of a time base with the rotation of the drum.

The erase and bias oscillator 27 is controlled, as in FIG. 3, by the waveform (k) from the multivibrator 38 in such a manner that recording and erasure takes place only during the intervals 40 to 39 in waveform (k). There is provided a further reproducing head 42 introducing a time delay of, say, 2 ms. relatively to the recording head 24. The signal reproducing head 26 introduces a delay of 10 ms. relatively to the head 42 and therefore of 12 ms. relatively to the head 24. The head 42 produces an output which repeats itself at each revolution of the drum 25 while erasure is prevented by the waveform (k). This output is applied to a trigger reproducer amplifier 43 whose output (p) is applied to an amplitude gate 44. Only the large amplitude of the bottom echoes can pass through the gate 44 and the output of this gate, therefore, has the form (q) which is applied to trigger the time base 35, thus producing the time base waveform (r) which is fed to the display or recorder device 41. The output (o) of the reproducer amplifier 29 is delayed by 10 ms. relatively to the time of triggering of the time base and is also applied to the display or recorder device 41.

In this embodiment the triggering of the time base is locked to the rotation of the drum 25 and the display or recording sweeps can be arranged to continue over substantially the whole of the 500 ms. recurrence period.

The number of repetitions of the sweep that can be provided can be further increased by using the embodiment of FIG. 7 using the additional waveforms shown in FIG. 8. In FIG. 7 much of the equipment shown in FIG. 5 is duplicated and such parts are given the same references as in FIG. 5 but followed by the letter A or B. Thus two recording drums 25A and 25B are used, each in the same manner as in FIGURE 5.

The waveform (g) from the time gate 33 is applied to a switching waveform generator 50 which generates a switching waveform (s) by which erase and bias oscillators 27A and 27B are rendered operative alternately, one or the other of these oscillators being always operative. The signals from the transmitter-receiver equipment 10 are applied continuously to the recording heads 24A and 24B but are of course only operative when the corresponding erase and bias oscillator is operative.

The switching signals (s) also control a trigger switch 51 and a signal switch 52. The trigger switch 51 applies the outputs of the heads 42A and 42B alternately to the amplitude gate 44 and the signal switch 51 applies the outputs of the heads 26A and 26B alternately to the display or recorder device 41. The trigger signal from 42A or 42B and the echo signals from 26A or 26B is arranged to be applied to that one of the two drums 25A and 25B which is at any time not being erased.

It has been assumed heretofore in the various embodiments described that the transmitted pulses are of a constant recurrence frequency. This is not necessary and, in fact, some advantages can be obtained by making the pulse intervals other than constant. An example will be described with reference to FIG. 9.

$P_1$, $P_2$, $P_3$ . . . shown at (t) represent transmitted pulses at irregular intervals. The bottom echo from $P_1$ is shown in waveform (u) at $B_1$ and a fish echo from $P_1$ is shown at $F_1$. Echoes from subsequent pulses have the same subscript as the transmitted pulses giving rise to the echoes.

A time base waveform triggered from the bottom echoes $B_1$, $B_2$ . . . of waveform (u) is shown at (v). The delayed echo signals such as $DB_1$ and $DF_1$ are shown at (w) and by comparison of the waveforms (v) and (w) it is seen that, assuming that the fish represented by the echoes $F_1$, $F_2$ etc. remain at a constant distance from the sea bottom, the fish echo will be displayed at a fixed position on the time base.

Now considering an echo $N_1$ in waveform (u) from an object nearer the surface than the fish, this gives rise to the delayed echo signals shown at (x) and it will be seen that these do not produce a fixed display on the time base of waveform (v). Thus by using transmitted pulses at varying intervals it is possible to use a pulse recurrence period less than the echo time and nevertheless to avoid ambiguity since only echoes within a selected range produce a stationary display.

Instead of a drum 25 for magnetic recording there may be used other like means such as an endless tape.

Other forms of delay means than the magnetic recording means described may be used. For instance an acoustic delay device using a liquid or gas, or an electrical delay network may be used. Repetitions of the signal waveform may also be obtained by repeated reflection or by feed-back.

While separate transducers Tx and Rx for transmitting and receiving have been described, the invention can equally well be applied to common T/R arrangements.

The values of time intervals which have been referred to are, of course, given by way of example only and wide changes may be made in these.

The way in which the invention can be applied to systems other than echo-sounding systems will be understood by those skilled in the art. For example, it will be understood that the delay circuit 12 can be so constructed that time base generator 35 can be triggered by the first bottom echo of a pulse only or by a subsequent echo of that pulse, such as 19 in FIGURE 2(d). One advantage of storage-delay drum 25 over a delay network is that any given echo signal 20 can be repeated a number of times by providing a plurality of sweeps of the time base during each bottom echo recurrence period to "bright-up" the screen and maintain a sharp display with high definition.

While there have been described above what are presently believed to be the preferred forms of the invention, variations thereof will be obvious to those skilled in the art and all such changes and variations which fall within the spirit of the invention are intended to be covered by the generic terms in the appended claims, which are variably worded to that end.

We claim:

1. Echo-ranging and like equipment for presenting echo signals from a predetermined range of distances from a wave transmitter, the equipment comprising in combination a signal-presenting device having means responsive to a time base waveform to distribute the signal presentation in a time co-ordinate, an echo receiver, a time base waveform generator having an input terminal for the application of a signal to trigger the time base generator, selecting means coupled to the output of said receiver to select echo signals of predetermined characteristics, means applying said selected echo signals to said input terminal of said generator, means coupling said generator to said responsive means, signal-delaying means, means coupling the output of said receiver to the input of said signal delaying means, and means coupling the output of said signal-delaying means to said presenting device.

2. The combination set forth in claim 1, wherein said presenting device has means responsive to an applied signal to produce a deflection of the presentation in a direction transverse with respect to said co-ordinate and wherein the output of the signal-delaying means is coupled to the last-named responsive means.

3. The combination set forth in claim 1, wherein said presenting device is a cathode ray tube.

4. The combination set forth in claim 3, wherein said cathode ray tube has first and second beam deflecting means deflecting the beam in two mutually perpendicular directions, wherein said time base waveform generator is coupled to the first deflecting means of said tube and wherein the output of the signal-delaying means is coupled to the second deflecting means of said tube.

5. The combination set forth in claim 1, wherein said time base generator generates a time base waveform comprising a predetermined number of sweeps between successive selected echo signals in response to a triggering signal applied to the input terminal of said generator.

6. The combination set forth in claim 1, wherein said signal-delaying means comprise a magnetic recording device having a moving recording surface, a recording head coupled to the output of said receiver, a reproducing head coupled to said presenting device, and an erasing head to erase recorded signals.

7. The combination set forth in claim 6 comprising a further reproducing head located between said recording head and the first-named reproducing head in the direction of movement of said recording surface, the further reproducing head being coupled to said selecting means.

8. The combinaion set forth in claim 7, wherein said recording surface moves respectively past said heads and wherein means are provided for rendering said erasing head inoperative.

9. The combination set forth in claim 1, and means for preventing triggering of the time base generator in response to direct pulses from the transmitter and reflected pulses from near objects.

10. The combination set forth in claim 9, said means for preventing triggering comprising a muting and swept gain generator and a gain control amplifier, said muting and swept gain generator acting to blank said gain controlled amplifier at the same time of pulse transmission.

11. The combination set forth in claim 1, said signal delay means comprising signal storage means constructed to apply stored signals to said signal presenting devices at regular intervals whereby echoes presented by said presenting device are maintained at a selected level of brilliance independently of the interval between received echoes.

12. The combination set forth in claim 11, said signal delay means comprising a signal storage drum mounted for rotation and means to rotate said drum at a selected speed.

13. The combination set forth in claim 12, said time base generator being constructed to be triggered by a selected echo signal and once triggered to run freely generating a plurality of sweeps until stopped, said means to rotate said drum being constructed to provide display of echo signals stored on said drum a plurality of times during each recurrence period of a pulse transmitted by said time base generator after it has been triggered.

14. Echo-ranging and like equipment comprising a transmitter emitting bursts of wave with intervals between bursts, a receiver for receiving echoes from said waves and generating echo signals therefrom, signal storing means coupled to said receiver and repeating each of said echo signals a plurality of times at an output terminal thereof, a time base generator generating upon application thereto of a triggering signal a time base waveform repeating a plurality of times during each of said intervals, selecting means coupled to said receiver and selecting said triggering signal from said echo signals, means coupling said switch selecting means to said time base generator to apply said triggering signal to said generator, a presentation device having first and second input terminals, and indicating means deflected in a time co-ordinate in response to a signal applied to said first input terminal and means responsive to echo signals applied to said second input terminal to produce an indication of said echo signals in said presentation device, means coupling said time base generator to said first input terminal, and means coupling said output terminal of said storing means to said second input terminal.

15. The combination set forth in claim 14, wherein said presentation device is a cathode ray tube having first and second deflecting means deflecting the beam of said tube in mutually perpendicular directions, said indicating means are the beam of said tube, and said first and second input terminals are coupled respectively to said first and second deflecting means.

16. Echo-ranging and like equipment comprising in combination a transmitter emitting bursts of waves with intervals between bursts, a receiver for receiving echoes from said waves and generating echo signals therefrom, signal storing means comprising a moving member having a signal storing surface and having a recording head, and first and second reproducing head cooperating therewith, a time base generator, a signal presentation device having first and second input terminals, an indicating means in said presentation device deflected in a time co-ordinate in response to a signal applied to said first input terminal and means responsive to echo signals applied to said second input terminal to produce an indication of said echo signals in said presentation device, means coupling said time base generator to said first input terminal, means coupling said first reproducing head to said time base generator to apply triggering signals to said generator, means coupling said second reproducing head to said second input terminal, and means coupling said receiver to said recording head.

17. The combination set forth in claim 16, wherein said first and second reproducing heads are spaced apart in the direction of movement of said storing surface.

18. The combination set forth in claim 16, wherein said recording and reproducing heads are all spaced apart in the direction of movement of said storing surface.

19. Echo-ranging and like equipment for presenting echo signals from a predetermined range of distances from a wave transmitter, the equipment comprising in combination a signal-presentation device having means responsive to a time base waveform to distribute the signal presentation in a time co-ordinate, an echo receiver, a time base waveform generator having an input terminal for the application of a signal to trigger the time base generator, an amplitude gate passing only signals exceeding a predetermined amplitude, means coupling the output of said receiver to the input of said amplitude gate, means coupling the output of said amplitude gate to said input terminal of said generator, means coupling said generator to said receiving means, signal delaying means, means coupling the output of said receiver to the input of said signal delaying means, and means coupling the output of said signal delaying means to said presentation device.

20. The combination set forth in claim 19, said means coupling the output of said amplitude gate to said input terminal of said generator, comprising a time gate and said combination further comprising a transmitter circuit generating waves producing said echo signals, gating waveform generating means coupled to said transmitter circuit, and means coupling said gating waveform generating means to said time gate to open said time gate at predetermined times.

21. Echo-ranging and like equipment for presenting echo signals from a predetermined range of distance from a wave transmitter, the equipment comprising a signal-presenting device having means responsive to a time base wave-form to distribute the signal presentation in a time co-ordinate, an echo receiver, a time base waveform generator having an input terminal for the application of a signal to trigger the time base generator, selecting means coupled to the output of said receiver to select echo signals of predetermined characteristics, means applying said selected echo signals to said input terminal of said generator, means coupling said generator to said responsive means, signal-displacing means, means coupling said receiver, said signal-displacing means and said signal-presenting means, said signal-displacing means being so constructed and arranged that selected signals are displaced along said co-ordinate of said presentation device.

22. The combination set forth in claim 21, said signal presentation device being a cathode ray tube and said time base generator being constructed to generate a time base waveform comprising a predetermined number of sweeps between successive selected echo signals in response to a triggering signal applied to the input terminal of said generator.

23. The combination set forth in claim 22, said signal-displacing means comprising signal delaying means.

24. The combination set forth in claim 21, and means for preventing triggering of the time base generator in response to direct pulses from the transmitter, and reflected pulses from near objects.

25. The combination set forth in claim 24, said means for preventing triggering comprising delay means, a muting and swept gain generator and a gain controlled amplifier.

26. A ship installation of an echo sounder equipment of the kind adapted to examine with high resolution a predetermined relatively small part of the depth of water under the ship carrying the echo equipment, comprising a transmitter of pressure wave pulses, a transducer arranged to receive reflected pulses, a cathode ray tube indicating device, a time base generator arranged to apply a sweep voltage to said tube to generate a time base thereon, means fed from said transducer and responsive to the reflected pulse from the sea bed for triggering said time base generator, a time delay device fed from said transducer and means for applying the output signals from said delay device to said tube for display thereon.

27. An echo sounder as set forth in claim 26 wherein said means responsive to the reflected pulses from the sea bed comprises means responsive to pulses of amplitude greater than a predetermined value.

28. An echo sounder as set forth in claim 26 wherein delay means are provided for preventing triggering of the time base generator in response to direct pulses from the transmitter and reflected pulses from near objects.

29. An echo sounder as set forth in claim 26 wherein said means for triggering said time base generator is fed from said transducer via one amplifier, and said time delay device is fed from said transducer by a separate amplifier.

30. An echo sounder as set forth in claim 26 wherein said time delay device has a time delay equal to twice the time of transmission of a pulse through said desired depth.

31. An echo sounder as set forth in claim 26 wherein said time delay device comprises an impedance network.

32. The combination set forth in claim 26, and means for preventing triggering of the time base generator in response to direct pulses from the transmitter and reflected pulses from near objects.

References Cited in the file of this patent

UNITED STATES PATENTS

| | | |
|---|---|---|
| 2,378,383 | Arndt | June 19, 1945 |
| 2,646,555 | Straehl | July 21, 1953 |
| 2,721,987 | Richard | Oct. 25, 1955 |
| 2,729,803 | Harrison | Jan. 3, 1956 |
| 2,735,999 | Ross | Feb. 21, 1956 |
| 2,788,509 | Bolzmann | Apr. 9, 1957 |
| 2,853,824 | Schutz | Sept. 30, 1958 |